United States Patent
Yeates (10) Patent No.: US 8,159,091 B2
(45) Date of Patent: Apr. 17, 2012

(54) SWITCH CIRCUIT OF DC/DC CONVERTER CONFIGURED TO CONDUCT VARIOUS MODES FOR CHARGING/DISCHARGING

(75) Inventor: David Julian Yeates, Eys (NL)

(73) Assignee: Chimei Innolux Corporation, Miao-Li County (TW)

( * ) Notice: Subject to any disclaimer, the term of this patent is extended or adjusted under 35 U.S.C. 154(b) by 281 days.

(21) Appl. No.: 12/692,273

(22) Filed: Jan. 22, 2010

(65) Prior Publication Data

US 2010/0253154 A1 Oct. 7, 2010

Related U.S. Application Data

(60) Provisional application No. 61/165,521, filed on Apr. 1, 2009.

(51) Int. Cl.
*H02M 3/18* (2006.01)
(52) U.S. Cl. ........................................ 307/110
(58) Field of Classification Search ............... 307/110
See application file for complete search history.

(56) References Cited

U.S. PATENT DOCUMENTS 5,095,223 A * 3/1992 Thomas ............... 307/110
6,226,193 B1 * 5/2001 Bayer et al. .............. 363/59

FOREIGN PATENT DOCUMENTS

EP 1 073 185 A2 1/2001

* cited by examiner

*Primary Examiner* — Robert L. DeBeradinis
(74) *Attorney, Agent, or Firm* — Kirton McConkie; Evan R. Witt (57) ABSTRACT

A DC/DC converter includes an input terminal for receiving an input voltage; an output terminal for providing an output voltage; a ground terminal for providing a reference voltage; a plurality of charge pump capacitors including at least a first charge pump capacitor, a second charge pump capacitor, and a third charge pump capacitor; and a switch circuit. The switch circuit includes a plurality of switches configured to allow the plurality of charge pump capacitors connected in a hybrid parallel-series arrangement between the input terminal and the ground terminal or between the input terminal and the output terminal by selectively conducting a specified portion of the switches.

19 Claims, 10 Drawing Sheets

SWITCH CIRCUIT OF DC/DC CONVERTER CONFIGURED TO CONDUCT VARIOUS MODES FOR CHARGING/DISCHARGING

CROSS REFERENCE TO RELATED PATENT APPLICATION

This patent application claims the benefit of U.S. provisional patent application No. 61/165,521, filed Apr. 1, 2009.

FIELD OF THE INVENTION

The invention relates to a DC/DC converter including a switch circuit configured to conduct a variety of modes for charging/discharging of the DC/DC converter. The invention also relates to a switch circuit for use in such a DC/DC converter and an apparatus including such a DC/DC converter.

BACKGROUND OF THE INVENTION

A portable apparatus is usually powered from a battery. The battery delivers a battery voltage to a circuitry of the portable apparatus. However, sometimes the circuitry requires a larger voltage than the battery voltage in order to operate. Moreover, the larger voltage is typically also required to be a substantially stable pre-determined voltage, e.g. with a predetermined voltage level of 5.5 V. For this purpose, a DC/DC converter is used to convert an input voltage, such as the mentioned battery voltage, to an output voltage, such as the pre-determined voltage, provided at an output terminal.

One type of DC/DC-converter is a so-called charge-pump type. A charge-pump type DC/DC converter is operated by charging a capacitor during a charging phase, by connecting the capacitor between the input voltage and a ground voltage during a charging period, followed by a discharging of the capacitor during a discharging phase, by connecting the capacitor between an output terminal and the input voltage during a discharging period, thus providing an output voltage at the output terminal. The output voltage may, in an idealized situation without e.g. any switching losses and parasitic losses, correspond to twice the input voltage, as the input voltage loaded onto the capacitor during the charging phase is thus added to the input voltage during the discharging phase. The ratio between the output voltage and the input voltage may be referred to as a gain factor. In practice, the converter will have some losses and the ratio between the output voltage and the input voltage will be limited to a gain factor which is somewhat less than two.

Charging and discharging the capacitor is typically performed using a plurality of switches, arranged to selectively connect one electrode of the capacitor to the input terminal or ground and to selectively connect the other electrode of the capacitor to the output terminal or the input terminal. The output voltage may be adjusted by adjusting a voltage drop over the switches, e.g. by adjusting the on-resistance of a transistor when a transistor is used as a switch. This however reduces the efficiency of the converter, as the voltage drop over the switches corresponds to additional power loss. This reduced efficiency has a significant impact on power consumption which is an important point of attention in mobile applications. The ratio between the adjusted output voltage and the input voltage may be referred to as a boosting factor. The boosting factor thus corresponds to the gain factor multiplied by the efficiency of the converter. When using the above described charge-pump type DC/DC-converter, a lower boosting factor than the gain factor may be achieved by reducing the efficiency. When the gain factor is two and the required boosting factor is 1.5, the efficiency of the converter has thus to be reduced to 75% (ignoring further losses).

Figure 1:
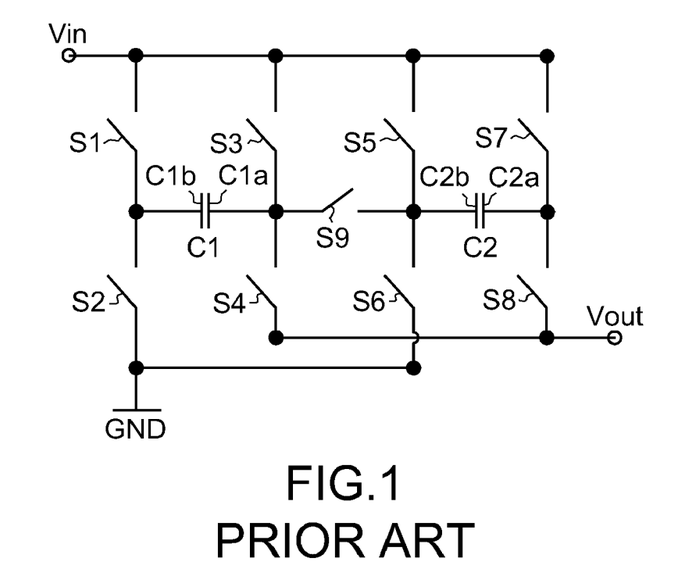
FIG. 1 schematically shows a DC/DC converter using two charge pump capacitors.

European patent publication No. EP 1 073 185 A2 describes a charge-pump type DC/DC converter using two capacitors C1 and C2, each arranged to be chargeable and dischargeable using four switches for each of the capacitors, i.e. switches S1, S2, S3 and S4 for the capacitor C1 and switches S5, S6, S7 and S8 for the capacitor C2, as shown in FIG. 1. The four switches associated with one capacitor are capable of selectively connecting the corresponding capacitor between an input voltage Vin and a ground voltage GND during the charging period, followed by the discharging of the corresponding capacitor during the discharging phase, by connecting the corresponding capacitor between an output voltage Vout and the input voltage Vin during the discharging period. The capacitors C1 and C2 are arranged to be connected either in series or in parallel using a further switch S9, which allows by proper settings of the switches and the further switch to operate the converter in two different modes: a first mode with the two capacitors being connected in series, as shown in FIG. 2A, and a second mode with the two capacitors being connected in parallel, as shown in FIG. 2B.

In more detail, as shown in FIG. 1, the DC/DC converter is arranged to convert an input voltage Vin to an output voltage Vout, both measured relative to a reference voltage GND, typically ground. The first charge pump capacitor C1 has a first electrode C1$a$ and a second electrode C1$b$ and the second charge pump capacitor C2 has a first electrode C2$a$ and a second electrode C2$b$. First switches S1, S5 associated with each of the charge pump capacitors can connect the second electrode C1$b$, C2$b$ of the corresponding charge pump capacitor C1, C2 to the input voltage Vin. Second switches S2, S6 associated with each of the charge pump capacitors can connect the second electrode C1$b$, C2$b$ of the corresponding charge pump capacitor C1, C2 to the reference voltage GND. Third switches S3, S7 associated with each of the charge pump capacitors can connect the first electrode C1$a$, C2$a$ of the corresponding charge pump capacitor C1, C2 to the input voltage Vin. Fourth switches S4, S8 associated with each of the charge pump capacitors can connect the first electrode C1$a$, C2$a$ of the corresponding charge pump capacitor C1, C2 to the output voltage Vout. The further switch S9 is provided between the first electrode C1$a$ of the first charge pump capacitor C1 and the second electrode C2$b$ of the second charge pump capacitor C2. The further switch S9 can thus connect the first charge pump capacitor C1 and the second charge pump capacitor C2 in series.

Figure 2A:
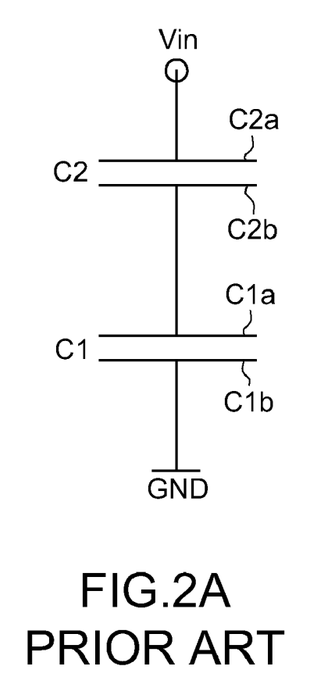
FIG. 2A-FIG. 2D schematically show a first and second mode of the DC/DC converter of FIG. 1.

In a charge phase of a first mode of the DC/DC converter, as illustrated in FIG. 2A, the switches S1~S9 establish a series arrangement of the first charge pump capacitor C1 and the second charge pump capacitor C2 in the charge phase between the input voltage Vin and the reference voltage GND, thus charging the first charge pump capacitor C1 and the second charge pump capacitor C2 to VC1=VC2=Vin/2, wherein VC1 denotes a voltage over the first charge pump capacitor C1 and VC2 denotes a voltage over the second charge pump capacitor C2. On the other hand, in a charge phase of a second mode of the DC/DC converter, as illustrated in FIG. 2B, the switches S1~S9 establish a parallel arrangement of the first charge pump capacitor C1 and the second charge pump capacitor C2 in the charge phase between the input voltage Vin and the reference voltage GND, thus charging both the first charge pump capacitor C1 and the second charge pump capacitor C2 to VC1=VC2=Vin.

Figure 2B:
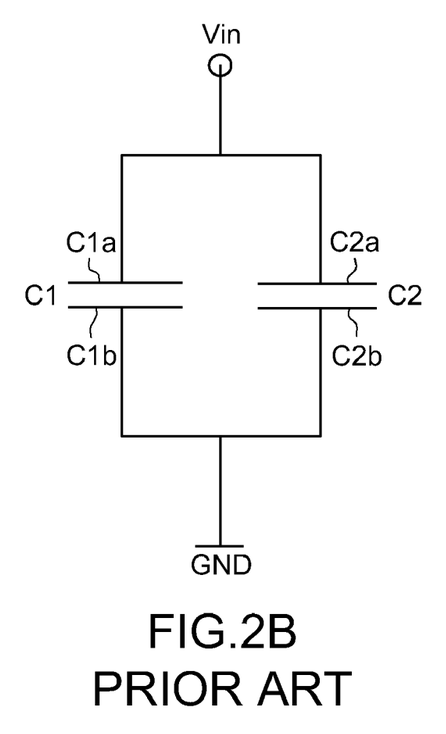
Figure 2C:
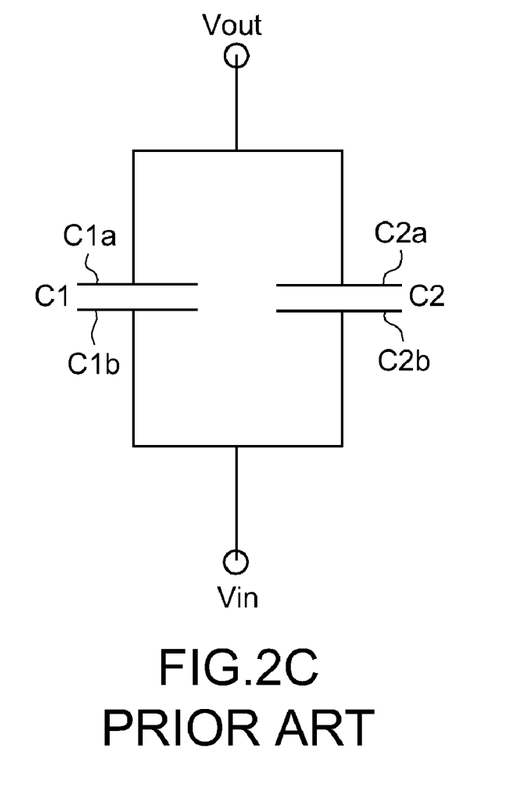

As described in EP 1 073 185 A2, the first and second charge pump capacitors C1, C2 may thus be loaded to either Vin/2 or Vin in the charge phase, using either the series arrangement of the first mode of FIG. 2A or using the parallel arrangement of the second mode of FIG. 2B respectively. Afterwards, a discharge phase of the DC/DC converter, as illustrated in FIG. 2C, is performed, wherein the switches S1~S9 establish a parallel arrangement of the first charge pump capacitor C1 and the second charge pump capacitor C2 in a discharge phase between the input voltage Vin and the output voltage Vout, thus providing the output voltage as Vout=Vin+VC1=Vin+VC2, with equal VC1 and VC2. The DC/DC converter may thus provide an output voltage of Vout=2*Vin when the first charge pump capacitor C1 and the second charge pump capacitor C2 were loaded to Vin using the second mode in the charge phase prior to the discharge phase, whereas the DC/DC converter may provide an output voltage of Vout=1.5*Vin when the first charge pump capacitor C1 and the second charge pump capacitor C2 were loaded to VC1=VC2=Vin/2 using the first mode in the charge phase prior to the discharge phase. The DC/DC converter may thus be operated with a gain factor of 2 or 1.5.

Figure 2D:
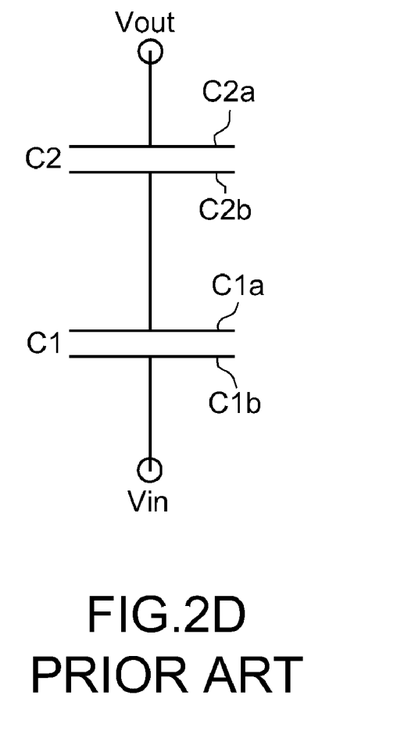

As mentioned above, EP 1 073 185 A2 describes that when charging and discharging using the second mode with the two capacitors being connected in parallel, the gain factor is two (ignoring losses), whereas when charging using the first mode with the two capacitors being connected in series and discharging using the second mode with the two capacitors being connected in parallel, the gain factor is 1.5 (ignoring losses). Hence, two boosting factors, 2.0 and 1.5, can be provided at the maximum efficiency, by selecting the second mode for discharging after charging with the first or the second mode. It may be appreciated that, use of the circuit described in EP 1 073 185 A2, also allows to provide a boosting factor of three at maximum efficiency, by charging using the second mode with the two capacitors being connected in parallel and discharging using the first mode with the two capacitors being connected in series, as illustrated in FIG. 2D, associated with a gain factor of three.

The charge-pump type DC/DC converter described in EP 1 073 185 A2 thus allows to provide a plurality of modes with corresponding gain factors, allowing to operate the converter with maximum efficiency for a plurality of boosting factors. However, maximum efficiency can only be achieved at three different boosting factors (ignoring losses) using such charging in either series or parallel connection and discharging in either series or parallel connection. Even when increasing the number of capacitors to a larger value, e.g. N capacitors, which can all be connected either in series or in parallel, the maximum efficiency can only be achieved at three different boosting factors (ignoring losses), corresponding to a first gain factor of 2, a second gain factor of 1+1/N, and a third gain factor of 1+N.

SUMMARY OF THE INVENTION

Therefore, it is an object of the invention to provide an increased number of different boosting factors with a charge-pump type DC/DC converter at maximum efficiency.

In accordance with a first aspect of the present invention, a DC/DC converter is provided. The DC/DC converter includes an input terminal for receiving an input voltage; an output terminal for providing an output voltage; a ground terminal for providing a reference voltage; a plurality of charge pump capacitors including at least a first charge pump capacitor, a second charge pump capacitor, and a third charge pump capacitor; and a switch circuit including a plurality of switches configured to allow the plurality of charge pump capacitors connected in a hybrid parallel-series arrangement between the input terminal and the ground terminal or between the input terminal and the output terminal by selectively conducting a specified portion of the switches.

In an embodiment, the DC/DC converter further includes a controller for controlling a conductive pattern of the switches of the switch circuit so as to change the DC/DC converter between a charging phase that the plurality of charge pump capacitors are connected between the input terminal and the ground terminal and a discharge phase that the plurality of charge pump capacitors are connected between the input terminal and the output terminal, and establish one of a variety of modes including the hybrid parallel-series arrangement for use in the charging phase or the discharging phase.

In accordance with a first aspect of the present invention, an apparatus including a DC/DC converter is provided. In addition to the DC/DC converter recited above, the apparatus further includes a battery and a circuit arrangement, wherein the battery is arranged to provide a battery voltage as the input voltage to the DC/DC-converter, and the DC/DC converter is arranged to provide the circuit arrangement with the output voltage.

In accordance with a first aspect of the present invention, a switch circuit for use with a plurality of charge pump capacitors in a DC/DC converter is provided. The DC/DC converter includes at least a first charge pump capacitor, a second charge pump capacitor, and a third charge pump capacitor, an input terminal for receiving an input voltage, an output terminal for providing an output voltage, and a ground terminal for providing a reference voltage. The switch circuit includes a first circuitry associated with the first charge pump capacitor, one electrode of the first charge pump capacitor being connectable via a first switch to the input voltage and via a second switch to the reference voltage and the other electrode of the first charge pump capacitor being connectable via a third switch to the input voltage and via a fourth switch to the output voltage; a second circuitry associated with the second charge pump capacitor, one electrode of the second charge pump capacitor being connectable via a fifth switch to the input voltage and via a sixth switch to the reference voltage and the other electrode of the second charge pump capacitor being connectable via a seventh switch to the input voltage and via an eighth switch to the output voltage; a third circuitry associated with the third charge pump capacitor, one electrode of the third charge pump capacitor being connectable via a ninth switch to the input voltage and via a tenth switch to the reference voltage and the other electrode of the third charge pump capacitor being connectable via an eleventh switch to the input voltage and via a twelfth switch to the output voltage; a first further switch, via which the one electrode of the first charge pump capacitor associated with the first circuitry being connectable to the other electrode of the second charge pump capacitor associated with the second circuitry; a second further switch, via which the one electrode of the second charge pump capacitor associated with the second circuitry being connectable to the other electrode of the third charge pump capacitor associated with the third circuitry; and a third further switch, via which the one electrode of the first charge pump capacitor associated with the first circuitry further being connectable to the other electrode of the third charge pump capacitor associated with the third circuitry.

In an embodiment, the switch circuit selectively connects the plurality of charge pump capacitors by: connecting the plurality of charge pump capacitors in a series arrangement of all charge pump capacitors in a first mode; connecting the plurality of charge pump capacitors in a parallel arrangement of all charge pump capacitors in a second mode; and connecting the plurality of charge pump capacitors in a first hybrid parallel-series arrangement in a third mode, the first hybrid parallel-series arrangement comprising a first sub-arrangement of at least two of the plurality of charge pump capacitors connected in a parallel arrangement and a second sub-arrangement of the other charge pump capacitors connected in series to the first sub-arrangement. The switch circuit further selectively connects the plurality of charge pump capacitors between the input terminal for receiving the input voltage and the ground terminal for charging the plurality of charge pump capacitors; and the input terminal for receiving the input voltage and the output terminal for providing the output voltage (Vout) from discharging the plurality of charge pump capacitors.

BRIEF DESCRIPTION OF THE DRAWINGS

These and other aspects of the invention will be further elucidated and described in detail with reference to the drawings, in which corresponding reference symbols indicate corresponding parts.

DETAILED DESCRIPTION OF THE PREFERRED EMBODIMENT

Figure 3:
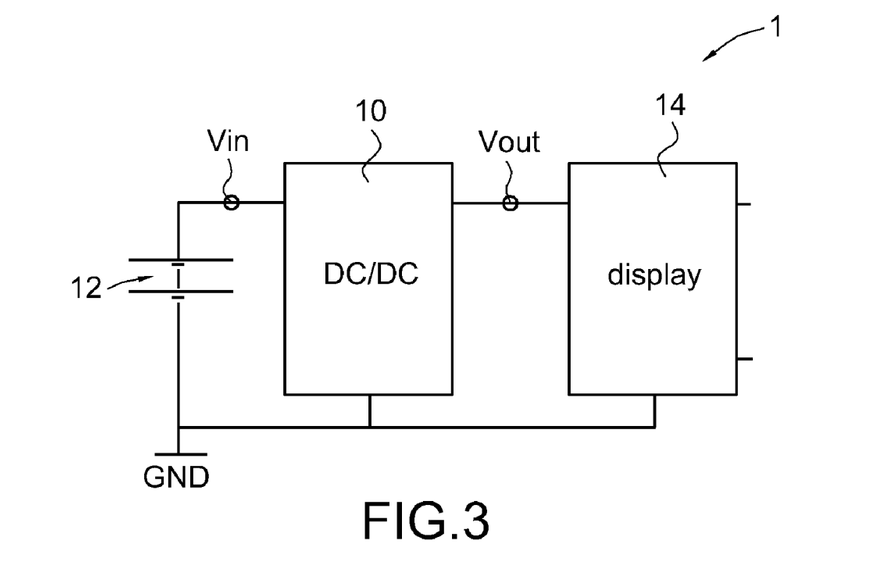
FIG. 3 schematically shows an apparatus according to the invention.

FIG. 3 schematically shows an apparatus 1 according to the invention.

The apparatus 1 comprises a DC/DC converter 10, connected to a battery 12 for receiving an input voltage Vin supplied by the battery 12, to ground GND, and to a circuit 14 for supplying the circuit 14 with an output voltage Vout. In the example shown in FIG. 1, the circuit 14 comprises a display. The voltage Vin supplied by the battery 12 may e.g. be typically 2.0-4.0 V, and may vary during use as, e.g., the battery 12 may become exhausted due to its use. The output voltage Vout required by the display 14 may e.g. be 5.5 V, or 6.0 V. The DC/DC converter 10 is arranged to control the output voltage Vout to a substantially constant level, by adjusting a boosting factor of the DC/DC converter, in particular by adjusting a gain factor and by adjusting a resistive load. Adjusting the resistive load may e.g. correspond to adjusting an on-resistance of a transistor (not shown in FIG. 1) in the DC/DC converter 10. The apparatus 1 may comprise additional elements than shown in FIG. 1. The apparatus 1 may e.g. be a mobile phone, which further comprises e.g. an apparatus controller in communication with the DC/DC converter 10 for being powered, the display 14, a radio, a keyboard, a microphone and a loudspeaker.

Figure 4:
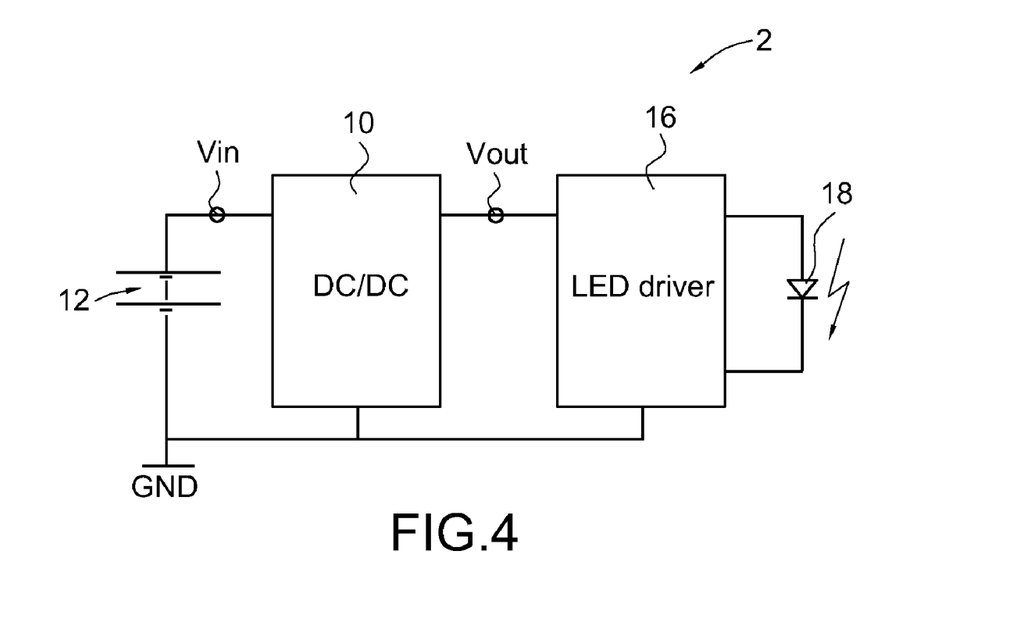
FIG. 4 schematically shows another apparatus according to the invention.

FIG. 4 schematically shows another apparatus 2 according to the invention. The apparatus 2 of FIG. 2 comprises similar components as the apparatus 1 of FIG. 1, but the DC/DC converter 10 shown in FIG. 2 is connected to a circuit comprising a LED driver 16 for supplying the LED driver 16 with the output voltage Vout. The DC/DC converter 10 may be arranged to control the output voltage Vout to a level required by the LED driver 16. The LED driver 16 is connected to a light-emitting diode circuit 18, comprising a LED diode or a plurality of LED diodes, and is arranged to operate the light-emitting diode circuit 18 with a LED current. The apparatus 2 may comprise additional elements other than shown in FIG. 2. The apparatus 2 may e.g. be a torch light, which further comprises a user switch in a housing, the user switch being operable by a user for turning the torch light on or off. The apparatus 2 may e.g. be incorporated in the apparatus 1 of FIG. 1, wherein the LED 18 is used as a light source of a display backlight unit for illuminating the display 14 and/or as a keyboard backlight unit for illuminating the keyboard.

The apparatus 1 and 2, for example, can be a mobile phone, digital camera, PDA (personal digital assistant), notebook computer, desktop computer, television, car display, global positioning system (GPS), avionics display, portable DVD player or any other suitable device with a battery, a DC/DC converter and a display.

Figure 5A:
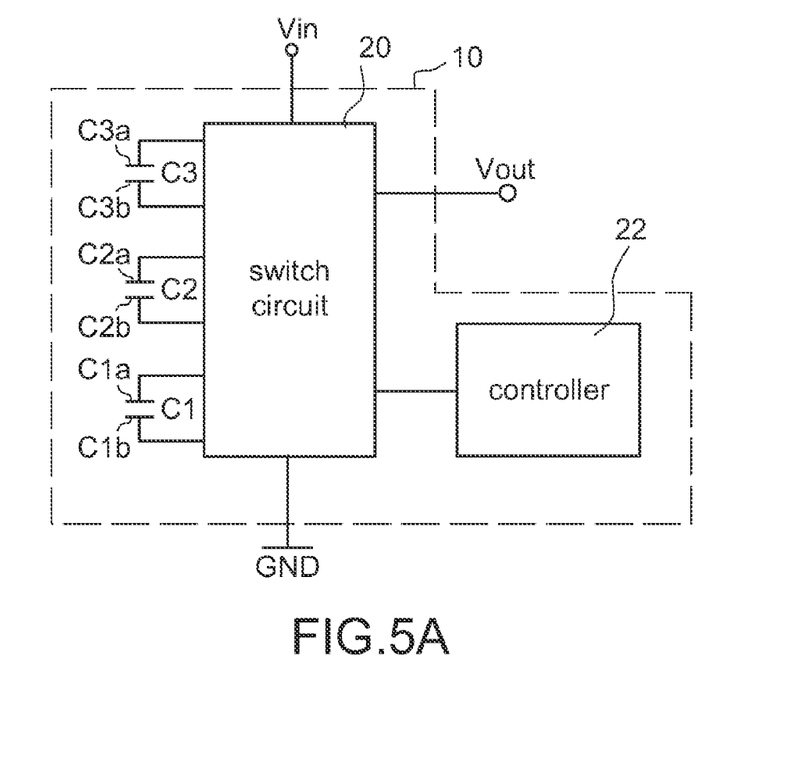
FIG. 5A and FIG. 5B schematically show an embodiment of a DC/DC converter using three charge pump capacitors according to the invention.
Figure 5B:
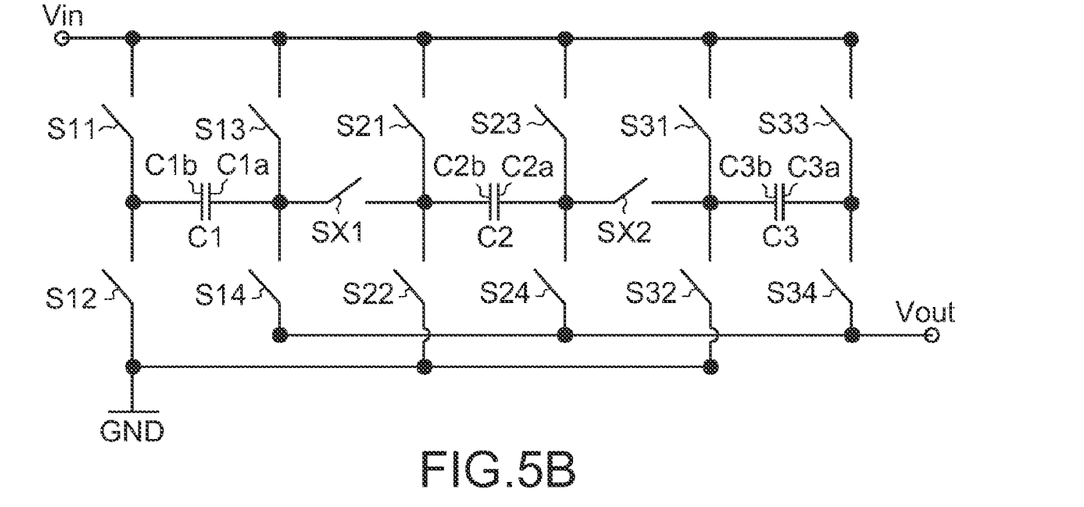

FIG. 5A and FIG. 5B schematically show a DC/DC converter using three charge pump capacitors according to a first embodiment of the invention.

FIG. 5A schematically shows the DC/DC converter 10. The DC/DC converter is arranged to convert an input voltage Vin to an output voltage Vout, both measured relative to a reference voltage GND, typically ground. The DC/DC converter has a first charge pump capacitor C1 with first electrode C1a and second electrode C1b, a second charge pump capacitor C2 with first electrode C2a and second electrode C2b and a third charge pump capacitor C3 with first electrode C3a and second electrode C3b.

As shown in FIG. 5B, a switch circuit 20 of the DC/DC converter comprises a first circuitry associated with the first charge pump capacitor C1, a second circuitry associated with the second charge pump capacitor C2, and a third circuitry associated with the third charge pump capacitor C3. The switch circuit 20 further comprises four switches S11, S12, S13, S14 associated with the first charge pump capacitor C1, forming the first circuitry; four switches S21, S22, S23, S24 associated with the second charge pump capacitor C2, forming the second circuitry; four switches S31, S32, S33, S34 associated with the third charge pump capacitor C3, forming the third circuitry; and all the switches are controlled by a controller 22. The functioning of switches S11, S12, S13, S14, S21, S22, S23, S24 and the first further switch SX1 is similar to the switches S1~S9 described with reference to FIG. 1. Switches S31, S32, S33, S34 function analogous to switches S21, S22, S23, S24. A second further switch SX2 can connect the second charge pump capacitor C2 and the third charge pump capacitor C3 in series.

Figure 6A:
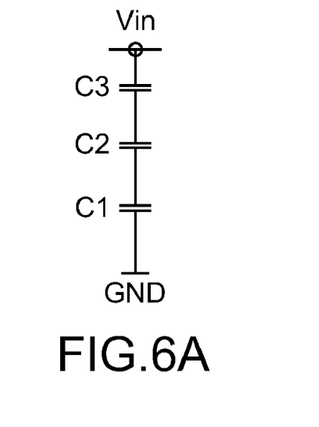
FIG. 6A-FIG. 6I schematically show charge phases of a variety of modes of the DC/DC converter of FIG. 5A-FIG. 5B.

FIG. 6A schematically shows a charge phase of a first mode of the DC/DC converter, wherein the switches S11, S12, S13, S14, S21, S22, S23, S24, S31, S32, S33, S34, SX1 and SX2 establish a series arrangement of the first charge pump capacitor C1, the second charge pump capacitor C2 and the third charge pump capacitor C3 in the charge phase between the input voltage Vin and the reference voltage GND by closing, i.e. conducting, the third switch S33 associated with the third charge pump capacitor to connect the first electrode C3a of the third charge pump capacitor to the input voltage; closing the second further switch SX2 to connect the second electrode C3b of the third charge pump capacitor to the first electrode C2a of the second charge pump capacitor; closing the first further switch SX1 to connect the second electrode C2b of the second charge pump capacitor to the first electrode C1a of the first charge pump capacitor; and closing the second switch S12 associated with the first charge pump capacitor to connect the second electrode C1b of the first charge pump capacitor to ground. All other switches are open, i.e. non-conducting. By way of such a conductive pattern of the switches, each of the charge pump capacitor C1, C2, C3 is charged to VC1=VC2=VC3=Vin/3, wherein VC1 denotes again a voltage over the first charge pump capacitor C1, VC2 denotes again a voltage over the second charge pump capacitor C2 and VC3 denotes a voltage over the third charge pump capacitor C3.

Figure 6B:
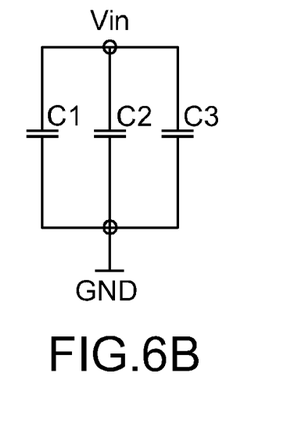

FIG. 6B schematically shows a charge phase of a second mode of the DC/DC converter, wherein the switches S11, S12, S13, S14, S21, S22, S23, S24, S31, S32, S33, S34, SX1 and SX2 establish a parallel arrangement of the first charge pump capacitor C1, the second charge pump capacitor C2 and the third charge pump capacitor C3 in the charge phase between the input voltage Vin and the reference voltage GND by closing, i.e. conducting, the third and second switches S33 and S32 associated with the third charge pump capacitor; closing the third and second switches S23 and S22 associated with the second charge pump capacitor; and closing the third and second switches S13 and S12 associated with the first charge pump capacitor. All other switches are open, i.e. non-conducting. By way of such a conductive pattern of the switches, all charge pump capacitors C1, C2 and C3 are charged to VC1=VC2=VC3=Vin.

The first, second and third charge pump capacitors C1, C2, C3 may thus be loaded to either Vin/3 or Vin in the charge phase, using the series arrangement of the first mode of FIG. 6A or using the parallel arrangement of the second mode of FIG. 6B respectively.

Figure 7A:
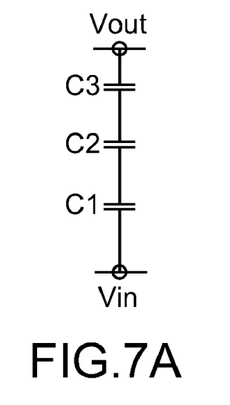
FIG. 7A-FIG. 7G schematically show discharge phases of a variety of modes of the DC/DC converter of FIG. 5A-FIG. 5B.
Figure 7B:
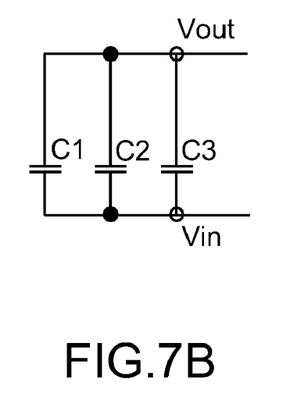

FIG. 7A schematically shows a discharge phase of the first mode of the DC/DC converter, wherein the switches S11, S12, S13, S14, S21, S22, S23, S24, S31, S32, S33, S34, SX1 and SX2 establish a series arrangement of the first charge pump capacitor C1, the second charge pump capacitor C2 and the third charge pump capacitor C3 in the discharge phase between the input voltage Vin and the output voltage Vout by closing, i.e. conducting, the fourth switch S34 associated with the third charge pump capacitor; closing the second further switches SX2; closing the first further switches SX1; and closing the first switch S11 associated with the first charge pump capacitor. All other switches are open, i.e. non-conducting. By way of such a conductive pattern of the switches, the output voltage is provided as Vin+VC1+VC2+VC3. The DC/DC converter may thus provide an output voltage of Vout=4*Vin when the charge pump capacitors C1, C2 and C3 were each loaded to Vin using the second mode in the charge phase prior to the discharge phase, whereas the DC/DC converter may provide an output voltage of Vout=2*Vin when the charge pump capacitors C1, C2 and C3 were loaded to Vin/3 using the first mode in the charge phase prior to the discharge phase. FIG. 7B schematically shows a discharge phase of the second mode of the DC/DC converter, wherein the switches S11, S12, S13, S14, S21, S22, S23, S24, S31, S32, S33, S34, SX1 and SX2 establish a parallel arrangement of the first charge pump capacitor C1, the second charge pump capacitor C2 and the third charge pump capacitor C3 in the discharge phase between the input voltage Vin and the output voltage Vout by closing, i.e. conducting, the fourth and first switches S34 and S31 associated with the third charge pump capacitor; closing the fourth and first switches S24 and S21 associated with the second charge pump capacitor; and closing the fourth and first switches S14 and S11 associated with the first charge pump capacitor. All other switches are open, i.e. non-conducting. By way of such a conductive pattern of the switches, the output voltage is provided as Vin+VC1=Vin+VC2=Vin+VC3, where VC1, VC2 and VC3 are the same. The DC/DC converter may thus provide an output voltage of Vout=2*Vin when the charge pump capacitors C1, C2 and C3 were loaded to Vin using the second mode in the charge phase prior to the discharge phase, whereas the DC/DC converter may provide an output voltage of Vout=1.333*Vin when the charge pump capacitors C1, C2 and C3 were loaded to VC1=VC2=VC3=Vin/3 using the first mode in the charge phase prior to the discharge phase.

The DC/DC converter of FIG. 5A-FIG. 5B may thus be operated with a gain factor of 4, 2, or 1.3333, by selecting a selected charge mode from the first and second mode for charging, as shown in FIG. 6A and FIG. 6B, selecting a selected discharge mode from the first and second mode for discharging, as shown in FIG. 7A and FIG. 7B, and using the selected charge mode for charging and subsequently the selected discharge mode for discharging.

As a matter of fact, by using the arrangement of FIG. 5B, charging phases more than the first and second modes as described with reference to FIG. 6A and FIG. 6B and discharging phases more than the first and second modes as described with reference to FIG. 7A and FIG. 7B can be provided. For example, FIGS. 6C~6G illustrate the use of selected two of the three capacitors C1, C2 and C3 in the charging phase, wherein the selected capacitors are connected between the input voltage Vin and the ground voltage GND in series or in parallel; while FIGS. 7C~7G illustrate the use of selected two of the three capacitors C1, C2 and C3 in the discharging phase, wherein the selected capacitors are connected between the input voltage Vin and the output voltage Vout in series or in parallel. The on/off switch control of the DC/DC converter of FIG. 5B to achieve these arrangements can be derived by those skilled in the art based on the above description and is not to be redundantly described herein.

Figure 6C:
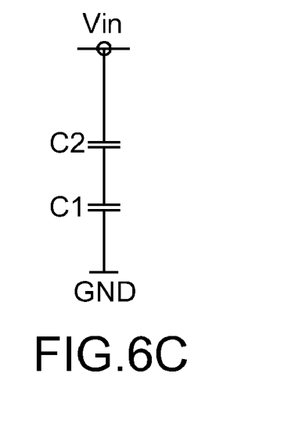
Figure 6D:
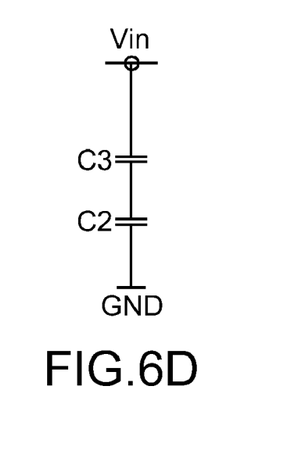
Figure 6E:
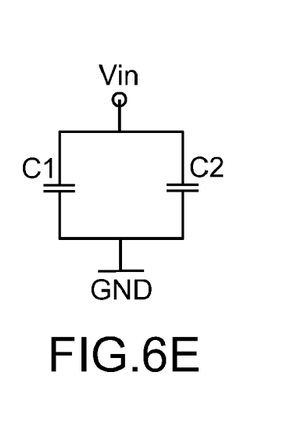
Figure 6F:
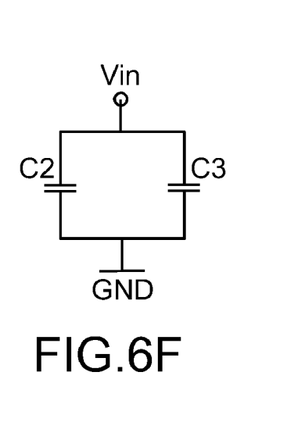
Figure 6G:
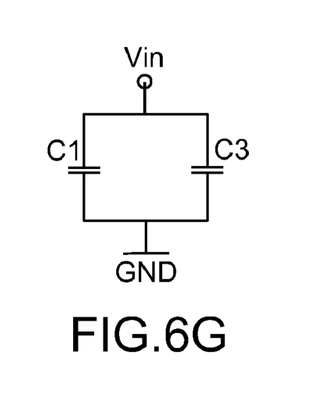
Figure 6H:
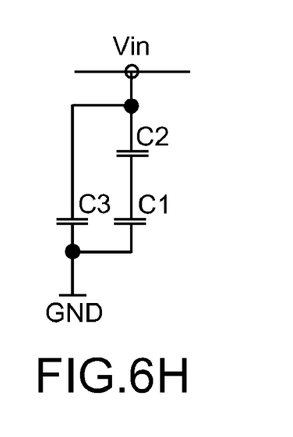
Figure 6I:
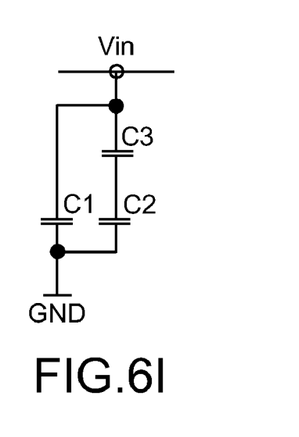

In addition, by using the arrangement of FIG. 5B, hybrid parallel-series arrangements can be provided in the charging phase, as illustrated in FIGS. 6H and 6I.

FIG. 6H shows the charge phase using an embodiment of a hybrid parallel-series arrangement comprising two charge pump capacitors C1 and C2 connected in series and forming a sub-arrangement, and charge pump capacitor C3 connected in parallel with the sub-arrangement between the input voltage Vin and the reference voltage GND and forming another sub-arrangement, with the switched S32, S33, S12, SX1 and S23 closed. Each of the two charge pump capacitors C1 and C2 is thus charged to VC1=VC2=½*Vin, while charge pump capacitor C3 is charged to VC3=Vin.

FIG. 6I shows the charge phase using an alternative embodiment of the hybrid parallel-series arrangement comprising two charge pump capacitors C2 and C3 connected in series and forming a sub-arrangement, and charge pump capacitor C1 connected in parallel with the sub-arrangement between the input voltage Vin and the reference voltage GND and forming another sub-arrangement, with the switches S12, S13, S22, SX2 and S33 closed. Each of the two charge pump capacitors C2 and C3 is thus charged to VC2=VC3=½*Vin, while charge pump capacitor C1 is charged to VC1=Vin.

Figure 8:
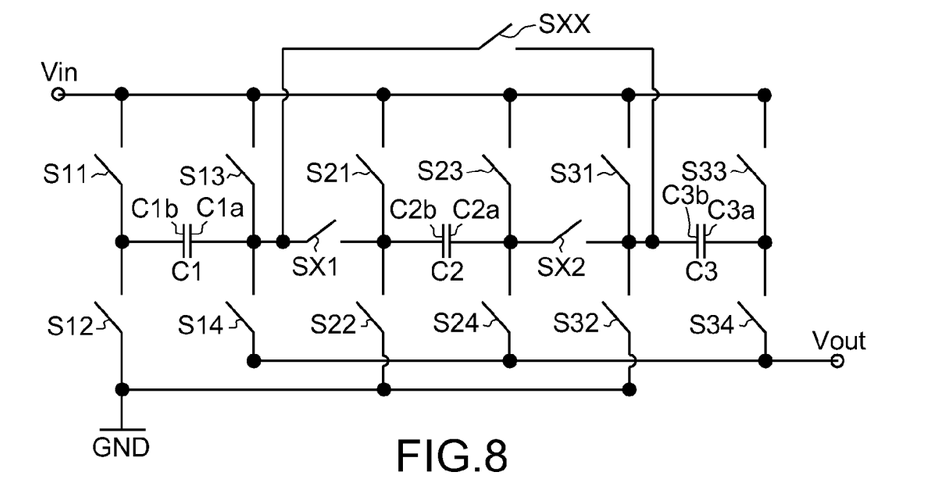
FIG. 8 schematically shows another embodiment of a DC/DC converter using three charge pump capacitors according to the invention.

For providing more modes in the charge phase and/or discharge phase, a second embodiment of the invention provides a third further switch SXX between the first electrode C1a of the first charge pump capacitor C1 and the second electrode C3b of the third charge pump capacitor C3 as is shown in FIG. 8. The third further switch SXX can thus connect the first charge pump capacitor C1 and the third charge pump capacitor C3 in series, while bypassing the second charge pump capacitor C2. FIG. 8 further comprises the same arrangement of switches and charge pump capacitors as FIG. 5B.

With the addition of the third further switch SXX, new modes can be provided in the charge phase and/or discharge phase, and new combinations of modes in the charge phase with modes in the discharge phase can be provided, for providing new gain factors and thus providing new boosting factors with maximum efficiency.

FIG. 9A-FIG. 9C and FIG. 10A-FIG. 10C schematically show examples of additional modes in charge and discharge phases that can be provided with the arrangement shown in FIG. 8.

Figure 9A:
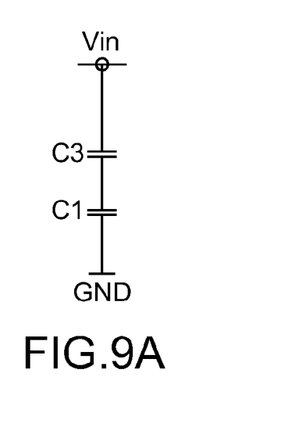
FIG. 9A-FIG. 9C schematically show charge phases of a variety of modes of the DC/DC converter of FIG. 8.

FIG. 9A, similar to FIGS. 6C and 6D, shows that two charge pump capacitors are selected from the three charge pump capacitors C1, C2 and C3. The two charge pump capacitors are connected in series between the input voltage Vin and the reference voltage GND. Each of the two charge pump capacitors is thus charged to VC=½*Vin. For example, using the embodiment shown in FIG. 9A, charge pump capacitors C1 and C3 are charged to VC1=VC3=½*Vin, while charge pump capacitor C2 is not used.

Figure 9B:
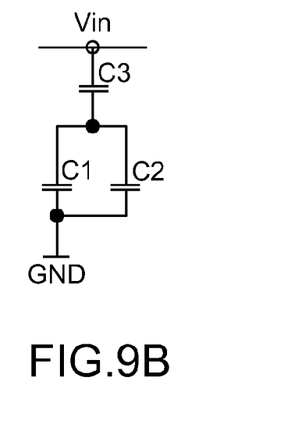

FIG. 9B shows the charge phase using an embodiment of another hybrid parallel-series arrangement comprising two charge pump capacitors C1 and C2 connected in parallel and forming a sub-arrangement, and charge pump capacitor C3 connected in series with the sub-arrangement between the input voltage Vin and the reference voltage GND and forming the another sub-arrangement, with switches S33, SX2, S22, SXX and S12 closed. Each of the two charge pump capacitors C1 and C2 is thus charged to VC1=VC2=⅓*Vin, while charge pump capacitor C3 is charged to VC3=⅔*Vin.

Figure 9C:
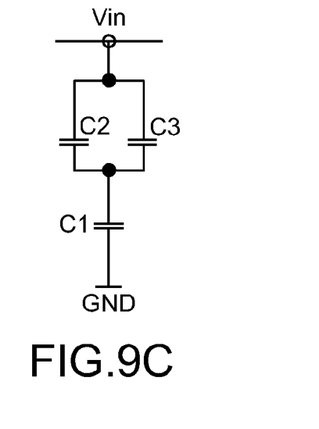

FIG. 9C shows the charge phase using an alternative embodiment of the hybrid parallel-series arrangement comprising the two charge pump capacitors C2 and C3 connected in parallel and forming a sub-arrangement, and charge pump capacitor C1 connected in series with the sub-arrangement between the input voltage Vin and the reference voltage GND and forming another sub-arrangement, with switches S12, SX1, S23, SXX and S33 closed. Each of the two charge pump capacitors C2 and C3 is thus charged to VC2=VC3=⅓*Vin, while charge pump capacitor C1 is charged to VC1=⅔*Vin.

Preferably but not necessarily, all charge pump capacitors that were charged during the charge phase are used in the discharge phase since it may have the advantage that all loaded charge is being transferred to the output, thus resulting in a relatively efficient converter with a relatively low output impedance.

For example, FIG. 7A shows the discharge phase of the first mode. The three charge pump capacitors C1, C2 and C3 are connected in series between the input voltage Vin and the output voltage Vout. The three charge pump capacitors C1, C2 and C3 are thus discharged to provide an output voltage Vout corresponding to Vout=Vin+VC1+VC2+VC3, i.e.:
Vout=2*Vin when charged according to FIG. 6A;
Vout=4*Vin when charged according to FIG. 6B;
Vout=2⅓*Vin when charged according to FIG. 9B or FIG. 9C; and
Vout=3*Vin when charged according to FIG. 6H or FIG. 6I.

FIG. 7B shows the discharge phase of the second mode. The three charge pump capacitors C1, C2 and C3 are connected in parallel between the input voltage Vin and the output voltage Vout. The discharge phase of the second mode may be used when all three charge pump capacitors C1, C2 and C3 have been charged to the same voltage VC1=VC2=VC3. The three charge pump capacitors C1, C2 and C3 are thus discharged to provide an output voltage Vout corresponding to Vout=Vin+VC1, i.e.:
Vout=1⅓*Vin when charged according to FIG. 6A; and
Vout=2*Vin when charged according to FIG. 6B.

Using the second mode for discharging according to FIG. 7B after charging according to FIG. 6B when a gain factor of 2 is required, may be advantageous over using the second mode for discharging according to FIG. 7A after charging according to FIG. 6A, as the effective capacitance for charging is reduced when charging according to FIG. 6A.

Figure 7C:
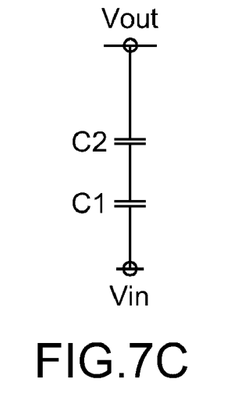
Figure 7D:
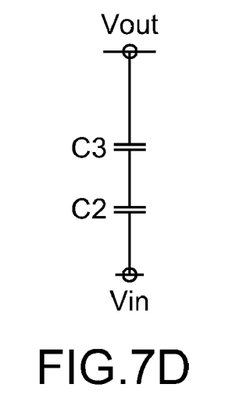

FIGS. 7C and 7D show that two charge pump capacitors are connected in series between the input voltage Vin and the output voltage Vout. The two charge pump capacitors are thus discharged to provide an output voltage Vout corresponding to Vout=Vin+2*VC, i.e.:
Vout=2*Vin when charged in series; and
Vout=3*Vin when charged in parallel.

Figure 7E:
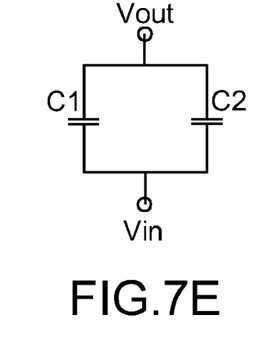
Figure 7F:
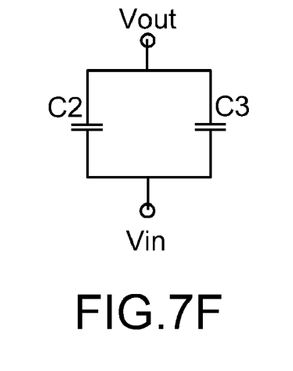
Figure 7G:
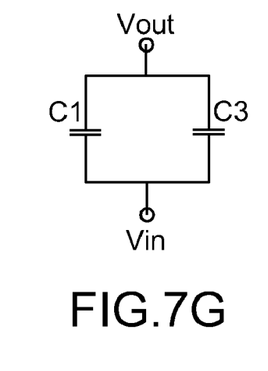

FIG. 7E-FIG. 7G show that two charge pump capacitors are connected in parallel between the input voltage Vin and the output voltage Vout. The two charge pump capacitors are thus discharged to provide an output voltage Vout corresponding to Vout=Vin+VC, i.e.:
Vout=1.5*Vin when charged in series; and
Vout=2*Vin when charged in parallel.

Figure 10A:
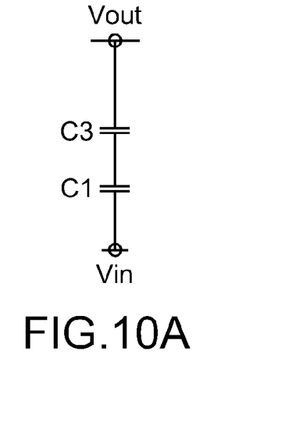
FIG. 10A-FIG. 10C schematically show discharge phases of a variety of modes of the DC/DC converter of FIG. 8.

FIG. 10A, similar to FIG. 7C and FIG. 7D, shows that two charge pump capacitors are connected in series between the input voltage Vin and the output voltage Vout. For example, the two charge pump capacitors C1 and C3 are used after the two charge pump capacitors C1 and C3 were charged in the charge phases according to either FIG. 9A or FIG. 6G. The two charge pump capacitors C1 and C3 are thus discharged to provide an output voltage Vout corresponding to Vout=Vin+2*VC, i.e.:
Vout=2*Vin when charged in series according to FIG. 9A; and
Vout=3*Vin when charged in parallel according to FIG. 6G.

Figure 10B:
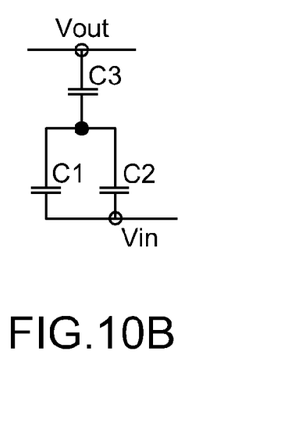

FIG. 10B shows the discharge phase of an embodiment of a third mode according to the invention, using an embodiment of a first hybrid parallel-series arrangement comprising a first sub-arrangement and a second sub-arrangement, with switches S34, SX2, S21, SXX and S11 closed. The two charge pump capacitors C1 and C2 are connected in parallel forming the first sub-arrangement. Charge pump capacitor C3 forms the second sub-arrangement and is connected in series with the sub-arrangement between the input voltage Vin and the output voltage Vout. The discharge phase of this embodiment may be used when the two charge pump capacitors C1 and C2 have been charged to the same voltage VC1=VC2. The three charge pump capacitors C1, C2 and C3 are thus discharged to provide an output voltage Vout corresponding to Vout=Vin+VC1+VC3, i.e.:

Vout=2*Vin when charged according to FIG. 9B; and
Vout=2.5*Vin when charged according to FIG. 6H.

Figure 10C:
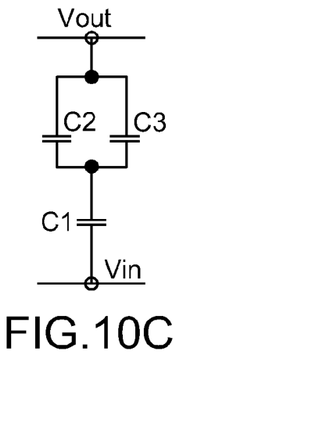

FIG. 10C shows the discharge phase of another embodiment of the third mode according to the invention using an alternative embodiment of a first hybrid parallel-series arrangement comprising a first sub-arrangement and a second sub-arrangement, with switches S11, SX1, S24, SXX and S34 closed. The two charge pump capacitors C2 and C3 are connected in parallel forming the first sub-arrangement of the second embodiment. Charge pump capacitor C1 forms the second sub-arrangement and is connected in series with the sub-arrangement between the input voltage Vin and the output voltage Vout. The discharge phase of this embodiment may be used when the two charge pump capacitors C2 and C3 have been charged to the same voltage VC2=VC3. The three charge pump capacitors C1, C2 and C3 are thus discharged to provide an output voltage Vout corresponding to Vout=Vin+VC1+VC3, i.e.:

Vout=1⅔*Vin when charged according to FIG. 6A;
Vout=3*Vin when charged according to FIG. 6B;
Vout=2*Vin when charged according to FIG. 9C; and
Vout=2.5*Vin when charged according to FIG. 6I.

The exemplary DC/DC converter according to the invention, as shown in FIG. 8, may thus be operated with a gain factor of 4, 3, 2.5, 2.333, 2, 1.6667 or 1.3333, by selecting a selected charge mode from a variety of modes for charging, as shown in FIG. 6A-FIG. 6I and FIG. 9A-FIG. 9C, selecting a selected discharge mode from a variety of modes for discharging, as shown in FIG. 7A-FIG. 7G and FIG. 10A-10C, and using the selected charge mode for charging and subsequently the selected discharge mode for discharging.

Figure 11A:
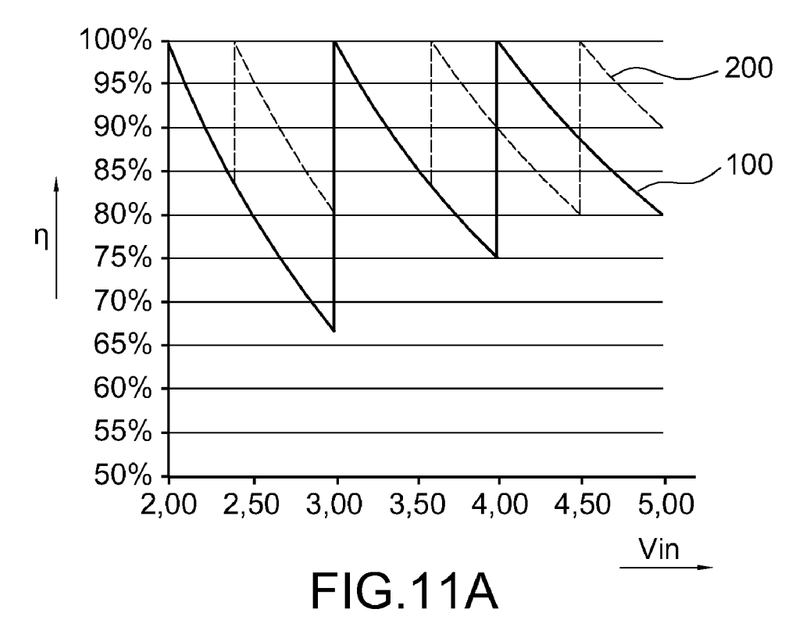
FIG. 11A and FIG. 11B show a comparison as a function of input voltage for DC/DC converters providing an exemplary constant output voltage.
Figure 11B:
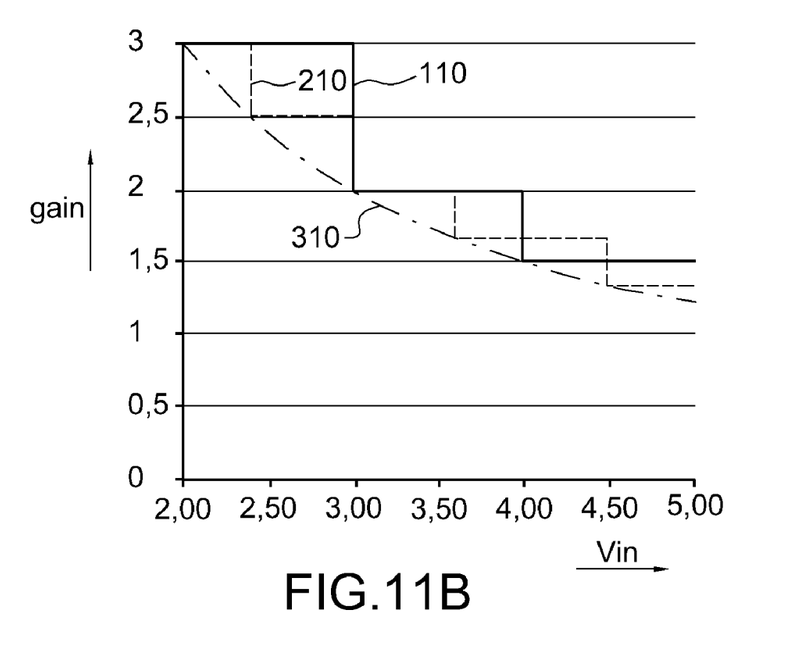

FIG. 11A and FIG. 11B show a comparison of efficiency as a function of input voltage for a DC/DC converter providing an exemplary constant output voltage Vout of 6.0 V.

The horizontal axis of FIG. 11A and FIG. 11B corresponds to the input voltage Vin as delivered by the battery to the DC/DC converter. The vertical axis of FIG. 11A corresponds to the efficiency, indicated with η. The vertical axis of FIG. 11B corresponds to the value of the gain factor and the boosting factor.

Dash-dotted curve 310 (FIG. 11B) corresponds to the boosting factor, required for obtaining an output voltage Vout of 6.0 V at the input voltage Vin shown along the horizontal axis.

First solid curve 100 (FIG. 11A) corresponds to the efficiency using a DC/DC converter using two capacitors, and using the serial and parallel modes for the charge phase and the discharging phase, allowing gain factors of 3, 2 and 1.5, as described above. The corresponding gain factors are illustrated in second solid curve 110 (FIG. 11B).

First dashed curve 200 corresponds to the efficiency using an embodiment of a DC/DC converter using three capacitors according to the invention, and using selections of the serial, parallel and hybrid serial-parallel modes for the charge phase and the discharging phase, allowing gain factors of 3, 2.5, 2, 1⅔ and 1⅓, as described above. The gain factors are illustrated in second dashed curve 210.

When comparing the second solid curve 200 with the first solid curve 100, it may be observed that the efficiency may reduce to below 70% around an input voltage of 2.9 V and to below 80% around an input voltage of 3.9 V for the DC/DC converter using only two capacitors, whereas the efficiency remains above 80% for the DC/DC converter using three capacitors according to the invention.

Likewise, when comparing the deviation of the second dashed curve 210 from the dash-dotted curve 310 with the deviation of the first dashed curve 110 from the dash-dotted curve 310, it may be observed that the gain factors with a DC/DC converter according to the invention deviates, on average and maximally, less from the boosting factor than the gain factors with a known DC/DC converter.

Figure 12:
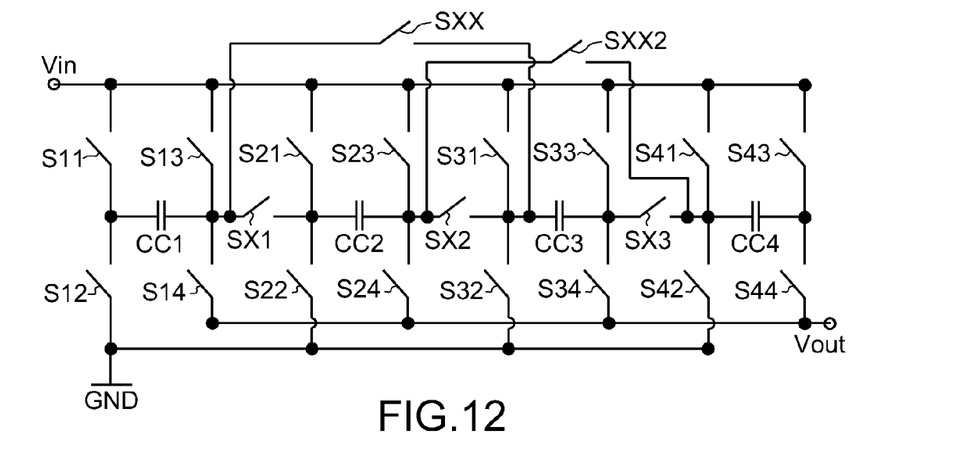
FIG. 12 and FIG. 13 show embodiments of a DC/DC converter according to the invention having four charge pump capacitors.
Figure 13:
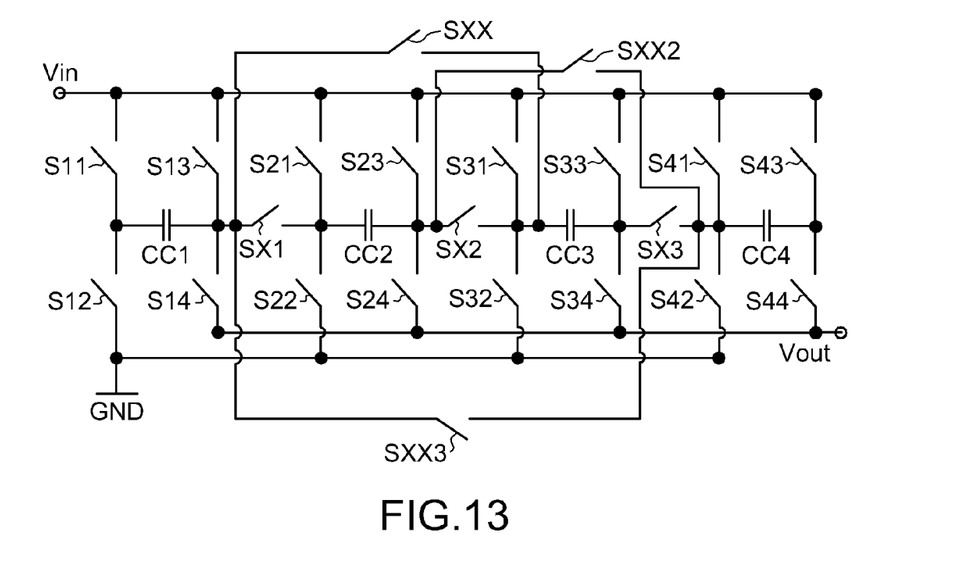

FIG. 12 and FIG. 13 show embodiments using first, second, third and fourth circuitries associated with four charge pump capacitors CC1, CC2, CC3 and CC4, respectively, each four switches, shown as S11, S12, S13, S14; S21, S22, S23, S24; S31, S32, S33, S34; and S41, S42, S43, S44. The switches similarly to the switches S11, S12, S13, S14, S21, S22, S23, S24, S31, S32, S33 and S34 in the circuitry arrangement with three charge pump capacitors C1, C2, C3 shown in FIG. 8. The switch arrangement further comprises further switches SX1, SX2 and SX3 allowing all four charge pump capacitors CC1, CC2, CC3 and CC4 to be connected in series, similarly to the switches SX1 and SX2 in the arrangement with three charge pump capacitors C1, C2, C3 shown in FIG. 8.

In FIG. 12 and FIG. 13, additional switches SXX and SXX2 are shown Additional switch SXX allows to establish a series connection of the first charge pump capacitor CC1 and the third charge pump capacitor CC3 while bypassing the second charge pump capacitor CC2, similarly to the third further switch SXX in the arrangement with three charge pump capacitors shown in FIG. 8. Additional switch SXX2 allows to establish a series connection of the second charge pump capacitor CC2 and the fourth charge pump capacitor CC4 while bypassing the third charge pump capacitor CC3 respectively.

In FIG. 13, a further additional switch SXX3 is added, allowing a series connection of the first charge pump capacitor CC1 and the fourth charge pump capacitor CC4 to be established while bypassing the second charge pump capacitor CC2 and the third charge pump capacitor CC3.

The arrangements of FIG. 12 and FIG. 13 allow further modes providing further gain factors, and thus allowing the efficiency to be increased further as further boosting factors with substantially maximum efficiency correspond to the further gain factors.

Figure 14:
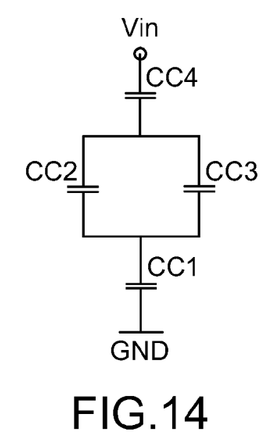
FIG. 14 shows an exemplified charge phase of the DC/DC converter of FIG. 12 or FIG. 13 according to the invention.

Take a charging phase in a mode shown in FIG. 14 as an example. The second charge pump capacitor CC2 and the third charge pump capacitor CC3 are arranged in parallel for forming a first sub-arrangement. The sub-arrangement is arranged in series with a second sub-arrangement comprising the first charge pump capacitor CC1 and the fourth charge pump capacitor CC4 between the input voltage Vin and ground GND, thus forming an embodiment of a first hybrid parallel-series arrangement. This charges the first charge pump capacitor CC1 and the fourth charge pump capacitor CC4 to VCC1=VCC4=0.4*Vin, and the second charge pump capacitor CC2 and the third charge pump capacitor CC3 to VCC2=VCC3=0.2*Vin, wherein VCC1, VCC2, VCC3 and VCC4 denote the voltages loaded in the respective charge pump capacitors CC1, CC2, CC3 and CC4.

An alternative first further mode may be provided by connecting the four charge pump capacitors CC1, CC2, CC3 and CC4 in an alternative embodiment of a first hybrid parallel-series arrangement. E.g. the first charge pump capacitor CC1, the second charge pump capacitor CC2 and the third charge pump capacitor CC3 may be arranged in parallel for forming an alternative first sub-arrangement, the fourth charge pump capacitor CC4 may form a second sub-arrangement, and the first and second sub-arrangement may be connected in series. This charges the first, second and third charge pump capacitors CC1, CC2 and CC3 to VCC1=VCC2=VCC3=0.25*Vin, and the fourth charge pump capacitor CC4 to VCC4=0.75*Vin.

Figure 15:
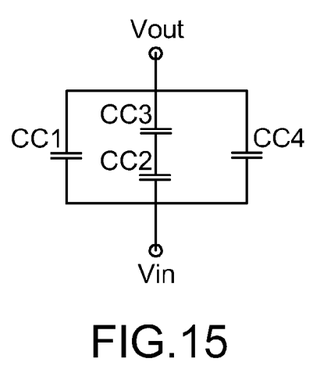
FIG. 15 and FIG. 16 show exemplified charge phases of the DC/DC converter of FIG. 12 or FIG. 13 according to the invention.

Take a discharging phase in a mode shown in FIG. 15 as an example. FIG. 15 shows a sub-arrangement of the second charge pump capacitor CC2 and the third charge pump capacitor CC3 arranged in series. The sub-arrangement is arranged in parallel with the first charge pump capacitor CC1 and the fourth charge pump capacitor CC4 between the input voltage Vin and the output voltage Vout. When used after the charging phase in the mode of FIG. 14, the four charge pump capacitors are thus arranged to provide an output voltage Vout corresponding to Vout=Vin+VCC1=1.4*Vin in the discharge phase.

Figure 16:
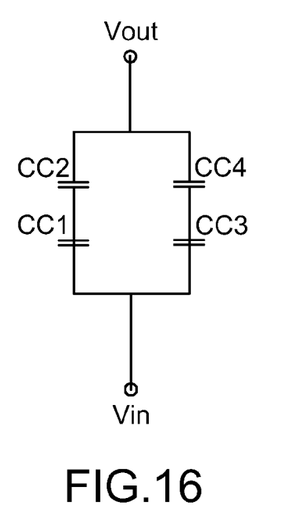

Further take a discharging phase in a mode shown in FIG. 16 as an example. FIG. 16 shows a first sub-arrangement of the second charge pump capacitor CC2 and the first charge pump capacitor CC1 arranged in series and a second sub-arrangement of the fourth charge pump capacitor CC4 and the third charge pump capacitor CC3 in series. The first and second sub-arrangement is arranged in parallel between the input voltage Vin and the output voltage Vout. When used after the charging phase in the first further mode of FIG. 19, the four charge pump capacitors are thus arranged to provide an output voltage Vout corresponding to Vout=Vin+VCC1+VCC2=1.6*Vin in the discharge phase.

It should be noted that the above-mentioned embodiments illustrate rather than limit the invention, and that those skilled in the art will be able to design many alternative embodiments without departing from the scope of the appended claims. For example, although the numerical examples given above use a plurality of capacitors of substantially equal capacitance value, the capacitors of the plurality of capacitors may have unequal capacitance values, allowing e.g. an increased number, of different values, boosting factors. For example, alternative types of switches may be used than those explicitly described above without departing from the scope of the invention and the appended claims. The switches S11, S12, S13, S14, S21, S22, S23, S24, S31, S32, S33, S34, S41, S42, S43, S44, SX1, SX2, SX3, SXX, SXX2 and SXX3 may be MOSFET transistors, or alternatively be e.g. IGBT transistors. The switches may be discrete switches, or the plurality of switches may be integrated in a single integrated circuit. In the claims, any reference signs placed between parentheses shall not be construed as limiting the claim. Throughout this document, the term "and/or" includes any and all combinations of one or more of the associated listed items.

What is claimed is:

1. A DC/DC converter, comprising:
   an input terminal for receiving an input voltage;
   an output terminal for providing an output voltage;
   a ground terminal for providing a reference voltage;
   a plurality of charge pump capacitors, comprising at least a first charge pump capacitor, a second charge pump capacitor, and a third charge pump capacitor; and
   a switch circuit including a plurality of switches configured to allow the plurality of charge pump capacitors connected in a hybrid parallel-series arrangement between the input terminal and the ground terminal or between the input terminal and the output terminal by selectively conducting a specified portion of the switches.

2. The DC/DC converter according to claim 1, further comprising a controller for controlling a conductive pattern of the switches of the switch circuit so as to change the DC/DC converter between a charging phase that the plurality of charge pump capacitors are connected between the input terminal and the ground terminal and a discharge phase that the plurality of charge pump capacitors are connected between the input terminal and the output terminal, and establish one of a variety of modes including the hybrid parallel-series arrangement for use in the charging phase or the discharging phase.

3. The DC/DC converter according to claim 2, wherein the variety of modes includes an essential series arrangement of some or all of the plurality of charge pump capacitors.

4. The DC/DC converter according to claim 2, wherein the variety of modes includes an essential parallel arrangement of some or all of the plurality of charge pump capacitors.

5. The DC/DC converter according to claim 2, wherein the controller controls the configuration of the switches to be the same or different arrangements selected from the variety of modes in the charging phase and in the discharging phase.

6. The DC/DC converter according to claim 1, wherein the hybrid parallel-series arrangement includes a first sub-arrangement of at least two of the plurality of charge pump capacitors connected in a parallel arrangement and a second sub-arrangement of the other charge pump capacitors connected in series to the first sub-arrangement.

7. The DC/DC converter according to claim 1, wherein the hybrid parallel-series arrangement includes a third sub-arrangement of at least two of the plurality of charge pump capacitors connected in a series arrangement and a second sub-arrangement of the other charge pump capacitors connected in parallel to the first sub-arrangement.

8. The DC/DC converter according to claim 1, wherein the switch circuit comprises:
   a first circuitry associated with the first charge pump capacitor, one electrode of the first charge pump capacitor being connectable via a first switch to the input voltage and via a second switch to the reference voltage and the other electrode of the first charge pump capacitor being connectable via a third switch to the input voltage and via a fourth switch to the output voltage;
   a second circuitry associated with the second charge pump capacitor, one electrode of the second charge pump capacitor being connectable via a fifth switch to the input voltage and via a sixth switch to the reference voltage and the other electrode of the second charge pump capacitor being connectable via a seventh switch to the input voltage and via an eighth switch to the output voltage;
   a third circuitry associated with the third charge pump capacitor, one electrode of the third charge pump capacitor being connectable via a ninth switch to the input voltage and via a tenth switch to the reference voltage and the other electrode of the third charge pump capacitor being connectable via an eleventh switch to the input voltage and via a twelfth switch to the output voltage;
   a first further switch, via which the one electrode of the first charge pump capacitor associated with the first circuitry being connectable to the other electrode of the second charge pump capacitor associated with the second circuitry; and
   a second further switch, via which the one electrode of the second charge pump capacitor associated with the second circuitry being connectable to the other electrode of the third charge pump capacitor associated with the third circuitry.

9. The DC/DC converter according to claim 8, wherein the switch circuit further comprises a third further switch, via which the one electrode of the first charge pump capacitor associated with the first circuitry further being connectable to the other electrode of the third charge pump capacitor associated with the third circuitry.

10. The DC/DC converter according to claim 8, wherein the switch circuit further comprises:
 a fourth circuitry associated with a fourth charge pump capacitor, one electrode of the fourth charge pump capacitor being connectable via a thirteenth switch to the input voltage and via a fourteenth switch to the reference voltage and the other electrode of the fourth charge pump capacitor being connectable via a fifteenth switch to the input voltage and via a sixteenth switch to the output voltage; and
 a fourth further switch, via which the one electrode of the third charge pump capacitor associated with the third circuitry being connectable to the other electrode of the fourth charge pump capacitor associated with the fourth circuitry.

11. The DC/DC converter according to claim 10, wherein the switch circuit further comprises a fifth further switch, via which the one electrode of the second charge pump capacitor associated with the second circuitry further being connectable to the other electrode of the fourth charge pump capacitor associated with the fourth circuitry.

12. The DC/DC converter according to claim 11, wherein the switch circuit further comprises a sixth further switch, via which the one electrode of the first charge pump capacitor associated with the first circuitry further being connectable to the other electrode of the fourth charge pump capacitor associated with the fourth circuitry.

13. The DC/DC converter according to claim 1, wherein all of the plurality of switches are MOSFET switches.

14. An apparatus comprising a DC/DC converter according to claim 1, a battery and a circuit arrangement, wherein the battery is arranged to provide a battery voltage as the input voltage to the DC/DC-converter, and the DC/DC converter is arranged to provide the circuit arrangement with the output voltage.

15. The apparatus according to claim 14, wherein the circuit arrangement is associated with at least a display device capable of displaying images on the display device.

16. The apparatus according to claim 14, wherein the circuit arrangement is associated with at least a light source capable of emitting light when driven by the circuit arrangement.

17. The apparatus according to claim 14, being selected from a group consisting of a mobile phone, digital camera, PDA (personal digital assistant), notebook computer, desktop computer, television, car display, global positioning system (GPS), avionics display and portable DVD player.

18. A switch circuit for use with a plurality of charge pump capacitors in a DC/DC converter, the DC/DC converter including at least a first charge pump capacitor, a second charge pump capacitor, and a third charge pump capacitor, an input terminal for receiving an input voltage, an output terminal for providing an output voltage, and a ground terminal for providing a reference voltage, and the switch circuit comprising:
 a first circuitry associated with the first charge pump capacitor, one electrode of the first charge pump capacitor being connectable via a first switch to the input voltage and via a second switch to the reference voltage and the other electrode of the first charge pump capacitor being connectable via a third switch to the input voltage and via a fourth switch to the output voltage;
 a second circuitry associated with the second charge pump capacitor, one electrode of the second charge pump capacitor being connectable via a fifth switch to the input voltage and via a sixth switch to the reference voltage and the other electrode of the second charge pump capacitor being connectable via a seventh switch to the input voltage and via an eighth switch to the output voltage;
 a third circuitry associated with the third charge pump capacitor, one electrode of the third charge pump capacitor being connectable via a ninth switch to the input voltage and via a tenth switch to the reference voltage and the other electrode of the third charge pump capacitor being connectable via an eleventh switch to the input voltage and via a twelfth switch to the output voltage;
 a first further switch, via which the one electrode of the first charge pump capacitor associated with the first circuitry being connectable to the other electrode of the second charge pump capacitor associated with the second circuitry;
 a second further switch, via which the one electrode of the second charge pump capacitor associated with the second circuitry being connectable to the other electrode of the third charge pump capacitor associated with the third circuitry; and
 a third further switch, via which the one electrode of the first charge pump capacitor associated with the first circuitry further being connectable to the other electrode of the third charge pump capacitor associated with the third circuitry.

19. The switch circuit according to claim 18 wherein the switch circuit selectively connects the plurality of charge pump capacitors by:
 connecting the plurality of charge pump capacitors in a series arrangement of all charge pump capacitors in a first mode;
 connecting the plurality of charge pump capacitors in a parallel arrangement of all charge pump capacitors in a second mode; and
 connecting the plurality of charge pump capacitors in a first hybrid parallel-series arrangement in a third mode, the first hybrid parallel-series arrangement comprising a first sub-arrangement of at least two of the plurality of charge pump capacitors connected in a parallel arrangement and a second sub-arrangement of the other charge pump capacitors connected in series to the first sub-arrangement; and
 wherein the switch circuit further selectively connects the plurality of charge pump capacitors between:
 the input terminal for receiving the input voltage and the ground terminal for charging the plurality of charge pump capacitors; and
 the input terminal for receiving the input voltage and the output terminal for providing the output voltage (Vout) from discharging the plurality of charge pump capacitors.

* * * * *